Jan. 21, 1947.   B. W. KELLY   2,414,649
AUTOMATIC ORTHOPHORIC SPLIT SLIDE HOLDER
Filed March 9, 1945
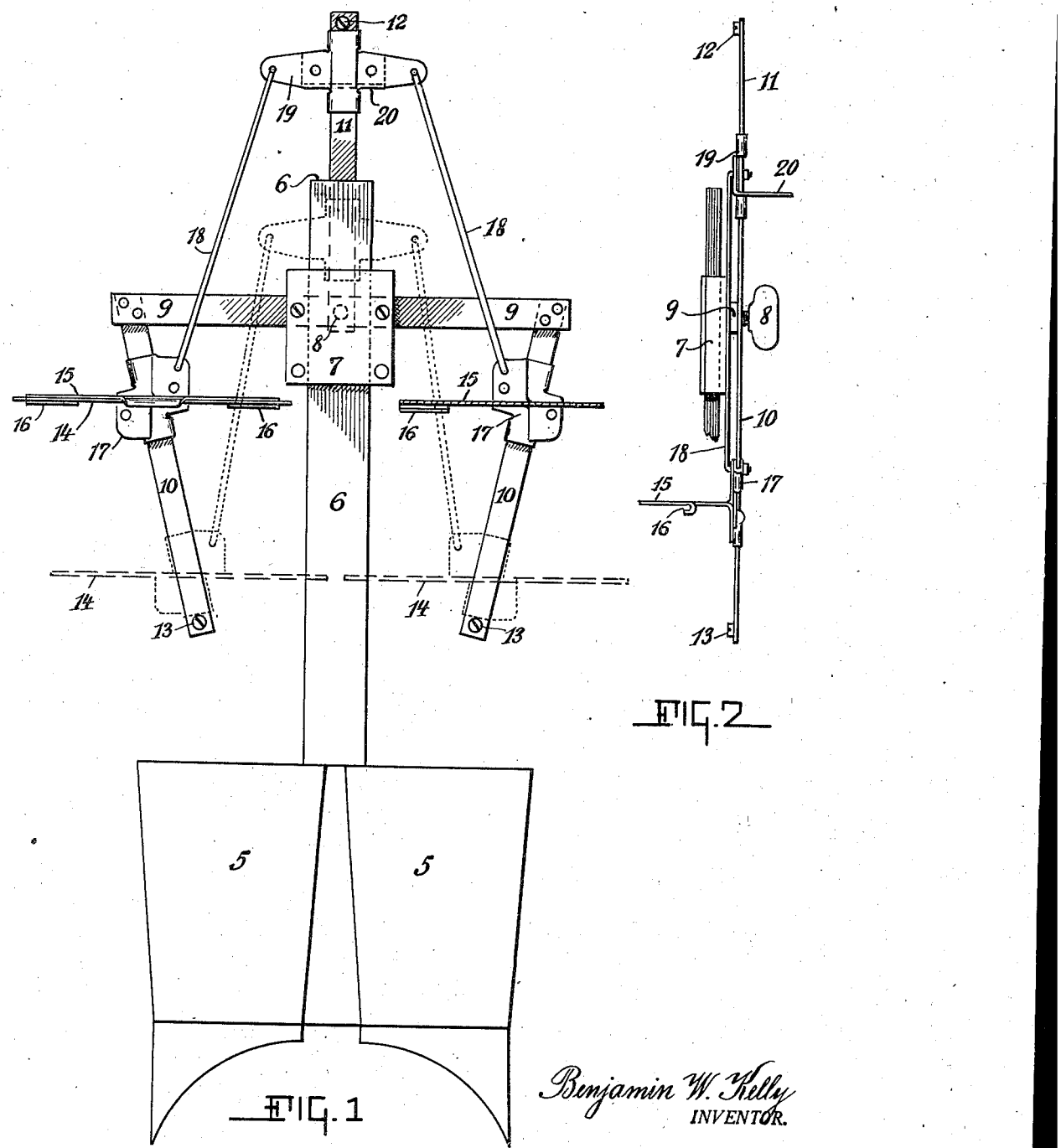

Patented Jan. 21, 1947

2,414,649

UNITED STATES PATENT OFFICE 2,414,649

AUTOMATIC ORTHOPHORIC SPLIT SLIDE HOLDER

Benjamin W. Kelly, Meadville, Pa., assignor to Keystone View Company, Meadville, Pa., a corporation of Pennsylvania Application March 9, 1945, Serial No. 581,777

1 Claim. (Cl. 128—76.5)

This invention relates to instruments for testing and training binocular vision. The object of the invention is to provide an automatic orthophoric split slide holder in the form of a novel improved and easily operated attachment adapted to be mounted upon the central shaft of a standard optical instrument for binocular vision. The invention is characterized by providing means for automatically and simultaneously moving two targets or split picture slides towards and away from each other as they are moved longitudinally along the line of sight of the standard optical instrument, said pictures representing the stereoscopic complement of one another. The function of such an optical instrument is well known in the art.

In the accompanying drawing Fig. 1 is a plan view of an attachment embodying the invention and shows the attachment mounted on the optical instrument, parts are in section and parts broken away. Fig. 2 is a side view of the attachment looking from the right side in Fig. 1.

In Fig. 1 a standard optical instrument for binocular vision is identified in conventional form by the binoculars 5, 5 and the usual central shaft 6. This illustration is sufficient for those skilled in the art to understand the invention.

The attachment, that is the automatic orthophoric split slide holder according to this invention, comprises an apertured main bearing member 7 which is adapted to be slid into adjusted position upon the central shaft and secured thereto by a clamping screw 8. To the bearing 7 there is secured a general support consisting of a transverse bar 9 and two inclined bars 10, 10. The latter are inclined towards the central line of sight of the instrument in a manner and to a degree which depends upon the kind of orthophoric practise for which the instrument is to be used. The transverse bar 9 also carries a fixed longitudinal bar 11 having a stop 12. The inclined bars have stops 13, 13.

The targets or split picture slides 14 are carried in split picture holders 15, 15 and are supported thereon in troughs 16 in the usual manner. The holders 15 are mounted on slide members 17, 17 which slide upon the inclined bars 10. The slide members 17 with the holders 15 and the pictures 14 are operated lengthwise of the bars 10 by means of link connections 18, 18. The forward ends of the links are pivotally supported in the slide members 17. The rear ends of the links 18 are likewise pivotally connected to the main slide member 19 which is provided with a finger grip 20 for moving said main member 19 along the central longitudinal bar 11.

In use, a pair of split picture slides 14, which represent the stereoscopic complement of one another, is placed in the split holders 15. Then by taking hold of the finger grip 20, the user moves the main slide member 19 along the longitudinal bar 11 and by way of the connecting links 18 the slide members 17 with the holders and the pictures are moved a proportional distance along the inclined bars 10. As the slide members 17 are thus moved along the bars 10, the split pictures are automatically moved towards and away from each other.

In Fig. 1 the parts and the picture slides 14 are shown in full lines in the far view position with the pictures farthest away from each other. The parts and the pictures 14 are shown in dotted lines in the near view position with the pictures close together. Fig. 2 shows the slide holders in an intermediary position. The stop 12 limits the movement in the far view position. The stops 13 limit the movement in the near view position.

Between the two extreme positions the split pictures will be moved transversely with respect to one another to an extent which is governed by the length and angular direction of the inclined bars 10.

The attachment is herein disclosed in its simplest form for use and practise in the art of training binocular vision. It is easily attached and detached from the standard instrument by tightening or loosening the clamping screw 20. The construction is simple and efficient, inexpensive to manufacture and well adapted to provide automatic simultaneous movement of the split picture slides with respect to one another as they are moved manually along the lines of sight of the instrument.

I claim:

An automatic orthophoric split slide holder as described comprising a central shaft extending along the viewing direction, a main bearing member carried by said shaft in adjustable relation, a transverse support secured to said bearing member and extending to each side of said central shaft, a guide bar secured to said transverse support on each side of the central shaft and inclined toward the latter in fixed angular relation in the longitudinal direction thereof, a bar secured to said main bearing member in axial longitudinal alinement with the central shaft, a main slide movably carried on said alined bar, a split slide holder movably supported on each of said guide bars, links pivotally connected to and between said main slide and each of said split slide holders for operating the latter in opposite directions upon said fixed guide bars and means for securing the said main bearing member in adjusted position along and upon the said central shaft.

BENJAMIN W. KELLY.